(12) United States Patent
Kwon et al.

(10) Patent No.: US 11,801,754 B1
(45) Date of Patent: Oct. 31, 2023

(54) SYSTEM, DEVICE, AND/OR PROCESS FOR DETERMINING MOTOR DRIVER SAFETY STATE FOR ELECTRIC VEHICLE

(71) Applicant: Mercedes-Benz Group AG, Stuttgart (DE)

(72) Inventors: Jeong Kwon, Ann Arbor, MI (US); Marko Sinistaj, West Bloomfield, MI (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/066,931

(22) Filed: Dec. 15, 2022

(51) Int. Cl.
*H02P 1/00* (2006.01)
*B60L 3/00* (2019.01)
*B60L 15/20* (2006.01)

(52) U.S. Cl.
CPC ......... *B60L 3/0084* (2013.01); *B60L 15/2009* (2013.01); *B60L 2240/527* (2013.01); *B60L 2240/529* (2013.01); *B60L 2260/40* (2013.01)

(58) Field of Classification Search
CPC .... H02P 29/02; B60L 3/0084; B60L 15/2009; B60L 2240/327; B60L 2240/529; B60L 2260/40
See application file for complete search history.

(56) References Cited

U.S. PATENT DOCUMENTS

| | | |
|---|---|---|
| 5,552,684 A | 9/1996 | Wada et al. |
| 11,128,251 B1 | 9/2021 | Solodovnik et al. |
| 2004/0245947 A1* | 12/2004 | Wilton ................ B60L 3/0092 318/139 |
| 2022/0115975 A1 | 4/2022 | Musaliyarakam et al. |

FOREIGN PATENT DOCUMENTS

| | | | |
|---|---|---|---|
| CN | 104477040 B | * | 8/2016 |
| CN | 113954796 A | * | 1/2022 |
| JP | 2022132179 A | * | 9/2022 ............ B60L 3/0046 |

\* cited by examiner

*Primary Examiner* — Karen Masih
(74) *Attorney, Agent, or Firm* — Dority & Manning, P.A.

(57) ABSTRACT

Example methods, apparatuses, and/or articles of manufacture are disclosed that may be implemented, in whole or in part, as techniques to transition between and/or among safety states of an electric motor driver unit (EMDU).

20 Claims, 7 Drawing Sheets

SYSTEM, DEVICE, AND/OR PROCESS FOR DETERMINING MOTOR DRIVER SAFETY STATE FOR ELECTRIC VEHICLE

BACKGROUND

1. Field

Subject matter disclose herein relates to electrically powered vehicle systems.

2. Information

Electrically powered automobiles (EVs) have been introduced as an alternative to internal combustion engine (ICE) vehicles to, among other things, reduce carbon emissions. While some EVs are capable of operating in either an electric mode (e.g., torque is applied to a drivetrain by an electric motor powered by a battery) or ICE mode as a so-called "hybrid" vehicle, other EVs may operate solely in an electric mode. An electric motor implemented in an EV may be deployed more generally as an electric machine capable of acting as a generator to convert kinetic energy to electric energy to charge a battery (e.g., while the EV is braking).

SUMMARY

One embodiment disclosed herein is directed to an apparatus comprising: a vehicle powertrain comprising an electric machine; and an electric motor driver unit (EMDU) to control delivery of power to the electric machine, the EMDU is to transition between and/or among safety states based, at least in part, on a measured and/or observed braking current generated responsive to a torque applied to the electric machine. In one particular implementation, the safety states of the EMDU comprise at least a six open switch state and a three phase short state. In another particular implementation, transition between and/or among safety states is further based, at least in part, on a measurement of a voltage signal applied to one or more supply terminals. In yet another particular implementation, the EMDU is transitioned to a hardware control mode responsive to detection of a critical fault. In yet another particular implementation, measurements and/or observations of the braking current comprise observations and/or measurements from a sensor coupled to a direct current (DC) voltage supply. In yet another particular implementation, the EMDU is to transition between and/or among the safety states of the EMDU, wherein the transitioning is responsive to the measured and/or observed braking current exceeding a defined threshold current. In yet another particular implementation, the EMDU is to transition between and/or among the safety states of the EMDU, wherein the transitioning is responsive to a measured and/or observed DC supply voltage exceeding a defined threshold voltage. In yet another particular implementation, the EMDU is to transition between and/or among the safety states of the EMDU wherein the transitioning is responsive to either the measured and/or observed braking current exceeding a defined threshold current for a set duration or a measured and/or observed DC supply voltage exceeding a defined threshold voltage. In yet another particular implementation, the EMDU to transition between and/or among the safety states of the EMDU, wherein the transitioning is responsive to the measured and/or observed braking current being below a defined threshold current for a set duration. In yet another particular implementation, the EMDU is to transition between and/or among the safety states of the EMDU, wherein the transitioning is responsive to the measured and/or observed DC supply voltage being below a defined threshold voltage.

Another embodiment disclosed herein is directed to a method comprising: measuring and/or observing a braking current generated responsive to a torque applied to an electric machine of a vehicle powertrain; and selectively transitioning between and/or among safety states of an electric motor driver unit (EMDU) to control delivery of power to the electric machine based, at least in part, on the measured and/or observed braking current. In one particular implementation, the safety states of the EMDU comprise at least a six open switch state and a three phase short state. In another particular implementation, selectively transitioning between and/or among safety states is further based, at least in part, on a measurement of a voltage signal applied to one or more supply terminals. In yet another particular implementation, the EMDU may be transitioned to a hardware control mode responsive to detection of a critical fault. In yet another particular implementation, measuring and/or observing the braking current comprises obtaining observations and/or measurements from a sensor coupled to a DC voltage supply.

Another embodiment disclosed herein is directed to an article comprising: a non-transitory storage medium comprising computer-readable instructions stored thereon which are executable by one or more processors of a computing device to: obtain measurements and/or observations of a braking current generated responsive to a torque applied to an electric machine of a vehicle powertrain; and selectively transition an EMDU to control delivery of power to the electric machine between and/or among safety states based, at least in part, on the measurements and/or observations of the braking current. In a particular implementation, the instructions are further executable by the one or more processors to selectively transition between and/or among the safety states of the EMDU, wherein the transitioning is responsive to either the measurements and/or observations of the braking current exceeding a defined threshold current or a measured and/or observed DC supply voltage exceeding a defined voltage threshold. In another particular implementation, the instructions are further executable by the one or more processors to selectively transition between and/or among the safety states of the EMDU, wherein the transitioning is responsive to either the measurements and/or observations of the braking current exceeding a threshold current for a set duration or a measured and/or observed DC supply voltage exceeding a voltage threshold. In yet another particular implementation, the instructions are further executable by the one or more processors to selectively transition between and/or among the safety states of the EMDU, wherein the transitioning is responsive to the measurements and/or observations of the braking current being below a defined threshold current for a set duration. In yet another particular implementation, the instructions are further executable by the one or more processors to selectively transition between and/or among the safety states of the EMDU, wherein the transitioning is responsive to the measurements and/or observations of the DC supply voltage being below a defined voltage threshold.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, an electric vehicle (EV) or other apparatus may be propelled by an electric machine configured as an electric motor in an electric motor driver unit (EMDU) that is powered by application of a direct current (DC) from a battery source to inverter circuitry that controls delivery of current to coils (e.g., formed on a stator and/or rotor). In a braking mode, inverter circuitry may configure the electric machine to operate as a generator to generate a braking current responsive to a braking torque using a so-called "regenerative braking" technique. Thus, the electric machine may in an embodiment be an electromotive converter device adapted both to convert electricity (e.g., electric current) to motion (e.g., rotation of the converter device) and to convert motion to electricity. Braking current generated responsive to such a braking torque may be applied to charge/recharge the battery source. Under some conditions, however, an uncontrolled braking current may cause an overvoltage condition and unintended brake torque, which may damage an EMDU and/or cause a car accident.

According to an embodiment, a braking current may be fed back to a rechargeable battery to recapture an automobile's kinetic energy during regenerative braking. In one particular implementation, a process to configure an electric machine in an EMDU to be an electric motor to supply torque or to generate a current using regenerative braking may be controlled, at least in part, by one or more programmable microcontroller units (MCUs) or other control circuit. Examples of a control circuit includes, e.g., a MCU, a field programmable logic array (FPGA), a programmable logic array (PLA), programmable array logic (PAL), an application specific integrate circuit (ASIC), a programmable logic circuit (PLC), or a processor. Such an MCU or other control circuit may, however, experience a critical fault that may prevent the MCU from controlling functions of an EMDU. Such a critical fault may arise from, for example, a critical power supply error, core calculation error, memory error or watch dog error, just to name a few critical errors that may disable an MCU from controlling certain functions of an EMDU. Thus, in an embodiment, a critical fault may be an error which disables a control circuit of the EMDU from performing one or more functions of the EMDU.

According to an embodiment, in the event that an MCU experiences a critical fault disabling the MCU from controlling certain functions of an EMDU, the EMDU may transition to a "hardware control" mode (e.g., from a core control mode, which is discussed below). Under some conditions, however, a braking current may cause over voltage damage and/or an unintended brake torque. Under such a hardware control mode, to safeguard against an overvoltage condition and an unintended brake torque electric braking, inverter circuitry may configure an electric machine to operate as an electric brake or as a limited electric generator that may be transitioned to be in particular "safety states." In an embodiment, a safety state may be a state of the electric machine that suppresses excessive fluctuation in how much torque is generated by the electric machine or suppresses excessive overvoltage (e.g., motor induction voltage) generated the electric machine. In a particular implementation of a hardware control mode, inverter circuitry may be transitioned between and/or among safety states such as a so-called "6 switch open" (6SO) and a "3-phase-short" (3PS) safety states. For instance, if the inverter circuitry includes a set of transistors or other electrical switches, such as a first set of three transistors that form a first three-phase inverter and a second set of three transistors that form a second three-phase inverter, the 6SO safety state may involve a state in which all of the six transistors are in an Off state, or more particularly in an open circuit state. In one aspect of an 6SO safety state, if a motor back EMF is lower than a battery voltage, an EMDU may not generate a torque. If a motor back EMF exceeds a battery voltage while in an 6SO safety state, on the other hand, an EMDU may not generate a torque. In one aspect of a 3PS safety state, a braking torque is to be based, at least in part, on a motor parameter and operating speed. In an embodiment, if the inverter circuitry has transistors forming a first three-phase inverter and has transistors forming a second three-phase inverter, the 3PS safety state may involve turning on, or more particularly shorting, all of the transistors of the first three-phase inverter or turning on all of the transistors of the second three-phase inverter. In one embodiment, an electric motor in an EMDU may be operated in a generator mode with a passive full bridge rectifier while in an 6SO safety state. In another embodiment, such an electric motor in an EMDU may be operated in an electric breaker mode while in an 3PS safety state.

Figure 1:
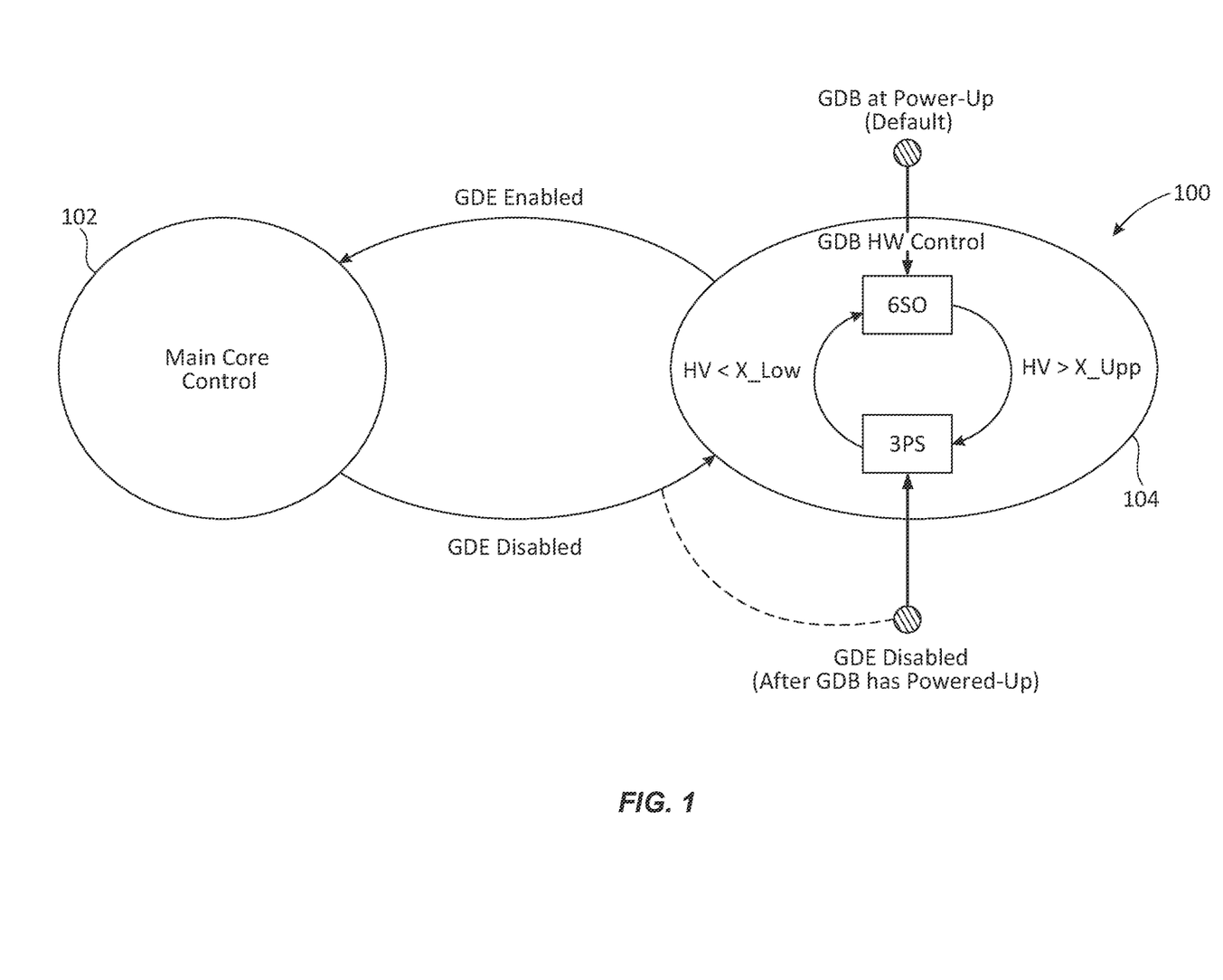
FIGS. 1 through 4 are flow diagrams illustrating transitions between and/or among states of an electric motor driver unit (EMDU), according to embodiments.

FIG. 1 is a state transition diagram illustrating transitions between safety states 6SO and 3PS in an embodiment 100. An MCU may maintain an EMDU in a main core control state 102 by, for example, controlling operation of the EMDU based, at least in part, on an observed battery voltage. Operation of such an EMDU may transition from main core control state 102 to a gate driver board (GDB) hardware control state 104 responsive to detection of a critical fault occurring at the MCU (e.g., responsive to a state of a gate driver enabled (GDE) signal being in a "GDE Disabled" state). Thus, in an embodiment, the EMDU may include an MCU or other control circuit, and may include hardware logic (e.g., GDB) which is separate from the control circuit. In such an embodiment, the main core control state may be a state in which operation of the EMDU is controlled by the MCU or other control circuit, or more specifically a state in which functions of the EMDU are carried out by the control circuit. The hardware control state in such an embodiment may be a state in which the operation of the EMDU is controlled by the hardware logic, which may take over the role of carrying out functions of the EMDU when, e.g., there is a critical fault which prevents the MCU from properly executing functions of the EMDU. Operation may continue in GDB hardware control state 104 until such time as a critical fault is addressed and/or cured (e.g., responsive to a state of a gate driver enabled (GDE) signal transitioning to a "GDE Enabled" state).

While in GDB hardware control state 104, an EMDU may transition between safety states 6SO and 3PS responsive to certain conditions. At power up, an EMDU may initially be in safety state 6SO and transition to safety state 3PS responsive to an observed supply voltage HV (e.g., received at a supply voltage terminal of inverter circuitry) exceeding a threshold voltage X_Upp. Operation may then transition back to safety state 6SO responsive to an observed supply voltage falling to below a threshold voltage X_Low.

Figure 2:
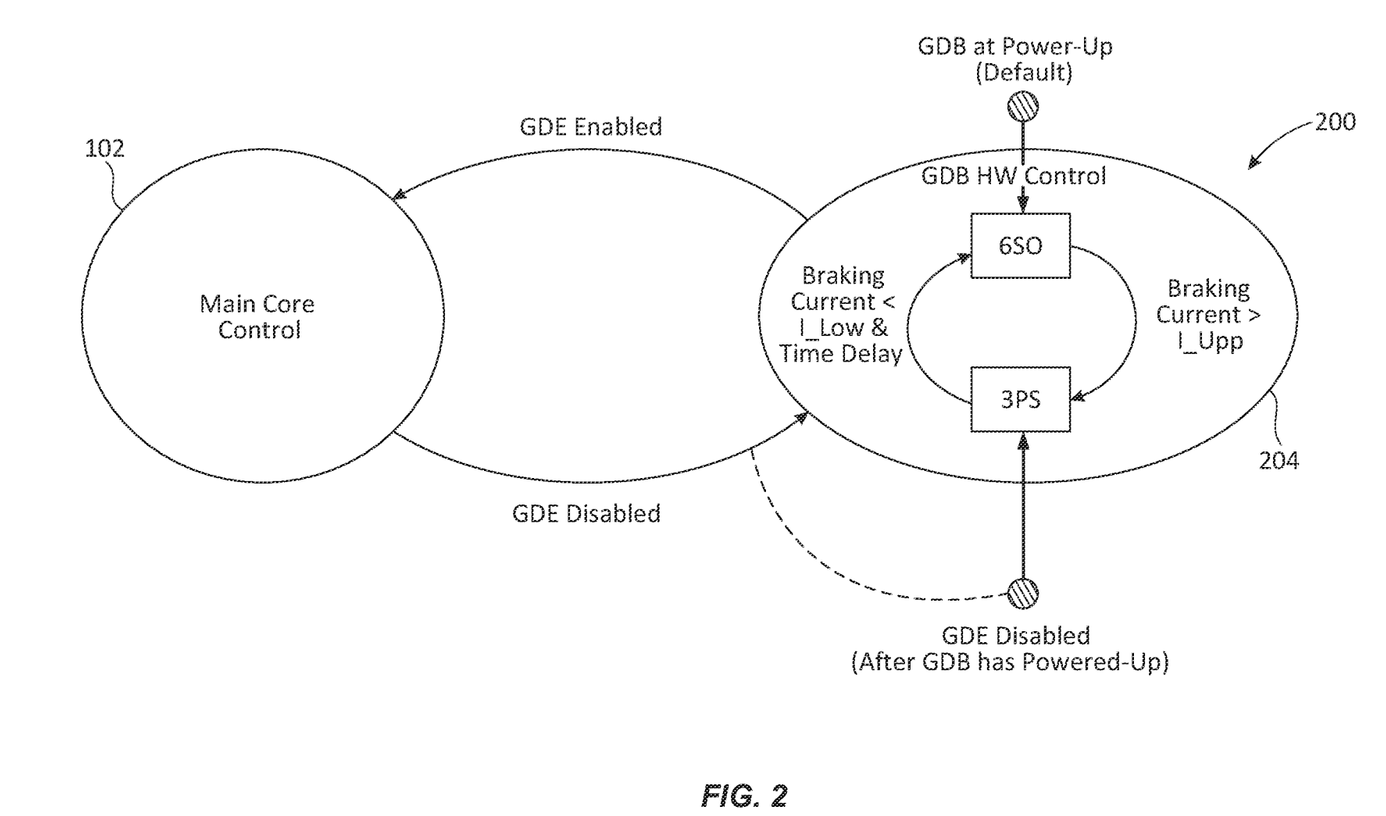

Basing transitions between safety states 6SO and 3PS solely on an observed supply voltage (e.g., independently of any observed battery voltage) may lead to suboptimal EMDU performance while in GDB hardware control state 104. As shown in embodiments 200, 300 and 400, transitions between safety states 6SO and 3PS may be further based, at least in part, on an observed braking current. As shown in embodiment 200 of FIG. 2, for example, GDB hardware control state 204 may transition from safety state 6SO to safety state 3PS responsive to a braking current Braking Current exceeding a threshold I_Upp. Responsive to Braking Current returning to below a threshold I_Low and maintaining to below threshold I_Low for a duration Time Delay, GDB hardware control state 204 may transition back to safety state 6SO from safety state 3PS.

Figure 3:
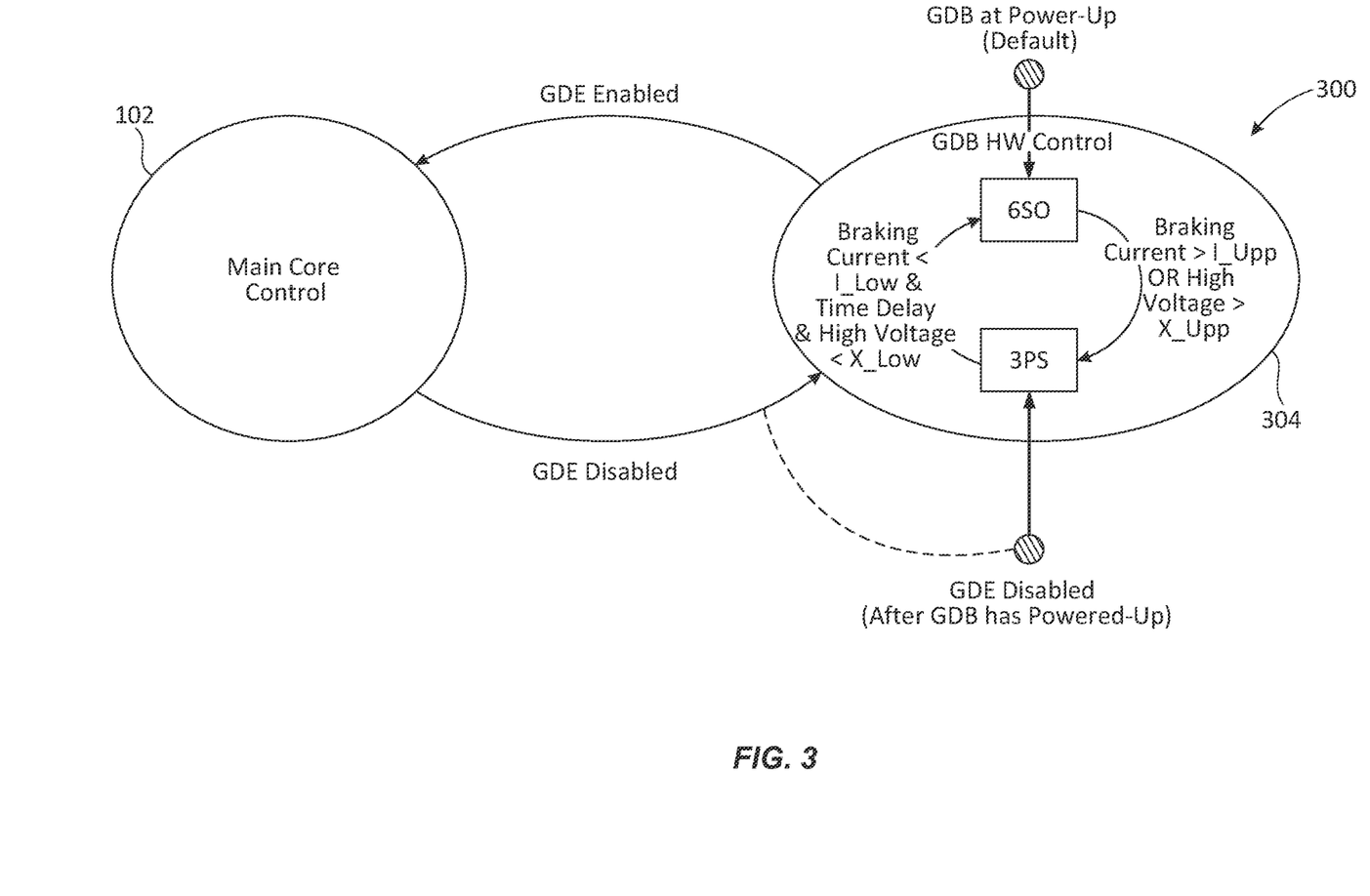

As shown in embodiment 300 of FIG. 3, GDB hardware control state 304 may transition between safety states 6SO and 3PS based, at least in part, on an observed supply voltage and an observed braking current. GDB hardware control state 304 may transition from safety state 6SO to safety state 3PS responsive to either braking current Braking Current exceeding a threshold I_Upp OR an observed supply voltage exceeding a threshold X_Upp. GDB hardware control state 304 may transition back to safety state 6SO from safety state 3PS responsive to Braking Current returning to below a threshold I_Low AND maintaining to below threshold I_Low for a duration Time Delay AND an observed supply voltage falling to below a threshold X_Low.

Figure 4:
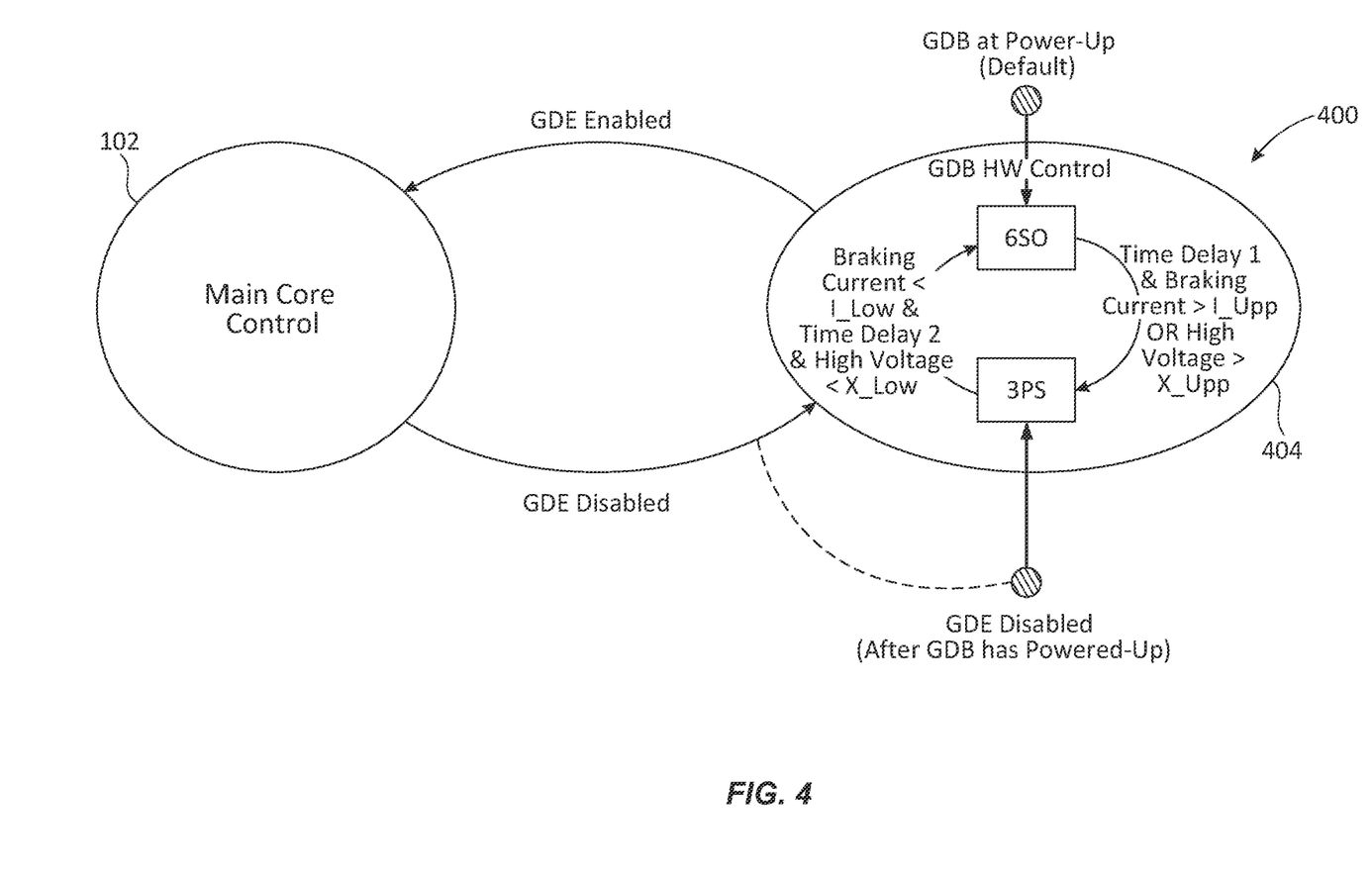
Figure 5:
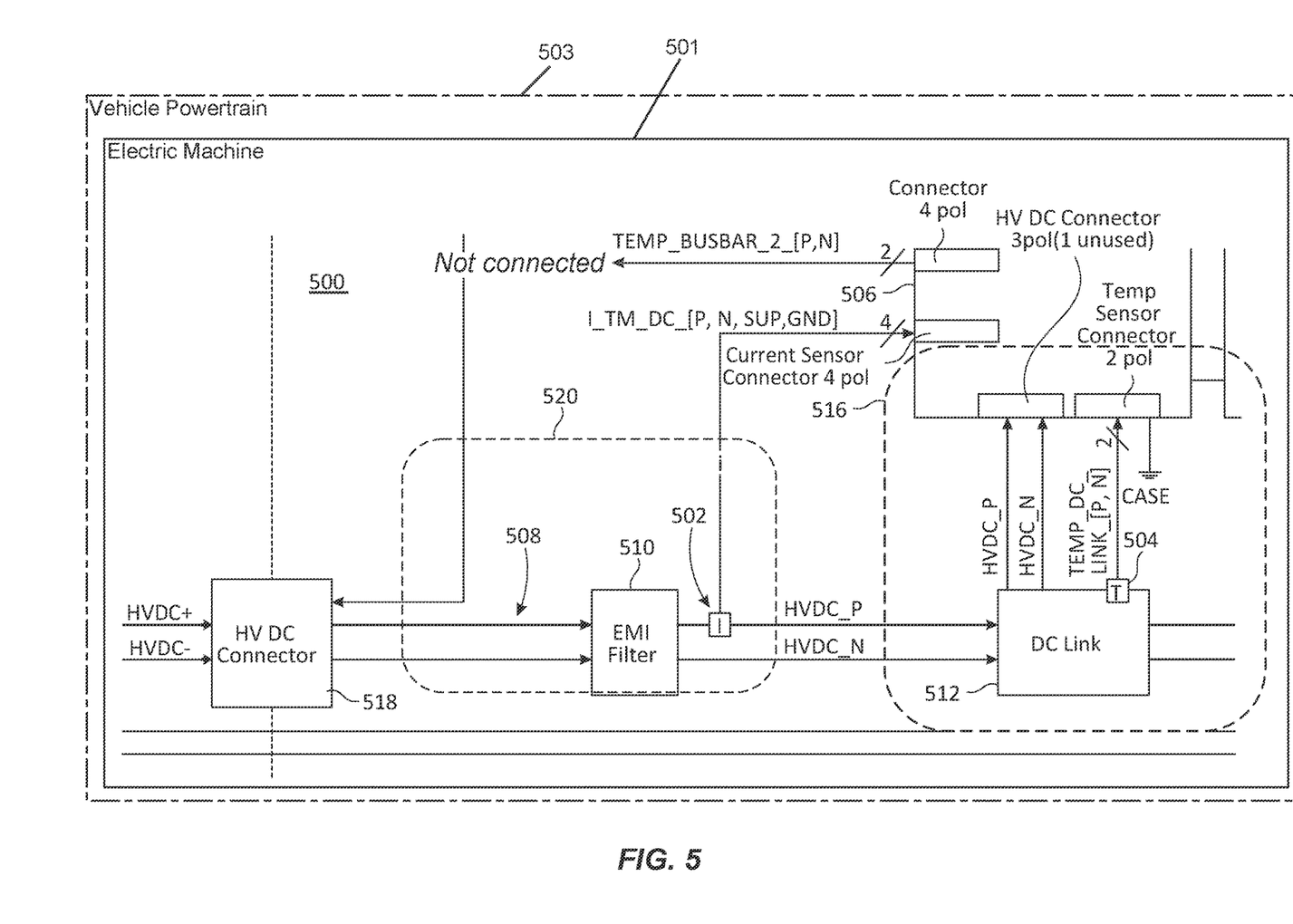
FIG. 5 is a schematic diagram of system to deliver power to an electric machine, according to an embodiment.

As shown in embodiment 400 of FIG. 4, GDB hardware control state 404 may likewise transition between safety states 6SO and 3PS based, at least in part, on an observed supply voltage and an observed braking current. GDB hardware control state 404 may transition from safety state 6SO to safety state 3PS responsive to either braking current Braking Current exceeding a threshold I_Upp, and maintaining a level exceeding threshold I_Upp for a duration Time Delay 1, OR an observed supply voltage exceeding a threshold X_Upp. GDB hardware control state 304 may transition back to safety state 6SO from safety state 3PS responsive Braking Current returning to below a threshold I_Low, and maintaining to below threshold I_Low for a duration Time Delay 2, AND an observed supply voltage falling to below a threshold X_Low. In a particular implementation, GDB hardware control state 404 may transition between safety states 6SO and 3PS according to the following conditions and/or parameters:

Vdc=600V, I_Upp =−50 A, Electric Motor Speed 6000 rpm;
X_Low=800V, X_Upp=900V;
Braking Power=600V*50 A =30 kW;
Braking Torque=30 kW/((6000*2*3.14/60)rad)=47 Nm;
Set I_Low=−10 A;
Braking Power=600V*−10 A=6 kW;
Braking Torque=6 kW/((6000*2*3.14/60)rad)=9.5 Nm;
Time Delay1:1 msec;
Time Delay2:200 msec;

FIG. 5 is a schematic diagram of a system 500 to deliver power to an electric machine 501, such as an electric machine implemented in an EMDU, according to an embodiment. Inverter circuitry 506 may provide a power signal to an electric machine 501 to apply a torque to a vehicle powertrain 503 from high-voltage signals HVDC_P and HVDC_N delivered from a battery (not shown). While the EMDU is in a GDB hardware control state (e.g., transitioned to the GCB hardware control state responsive to detection of a critical fault occurring at an MCU, not shown), inverter circuitry 606 may transition operation between safety states 6SO and 3PS based, at least in part, on local observations/measurements of a braking current obtained from a region 520 and/or a supply voltage obtained from a region 516. In a particular implementation, inverter circuitry 506 may transition operation between safety states 6SO and 3PS according to state transitions illustrated in embodiments 200, 300 and 400 shown in FIGS. 2, 3 and 4.

In the particular illustrated embodiment of system 500, HVDC_P and HVDC_N may be delivered via HV DC connector 518 coupled to a battery (not shown). A current sensor 502 coupled between EMI filter 510 and DC link 512 may provide a measurement of a braking current I_TM_DC_[P,N,SUP,GND] to inverter circuitry 506 based, at least in part, on voltage/current divider circuitry (not shown). Such a current sensor may be optionally coupled at a location 508 between HV DC connector 518 and EMI filter

510. According to an embodiment, HVDC_P and HVDC_N may be connected to inverter circuitry 506 to enable measurement of supply voltage. Such a supply voltage may be measured by a voltage sensor or voltage/current divider circuitry, for example.

Figure 6:
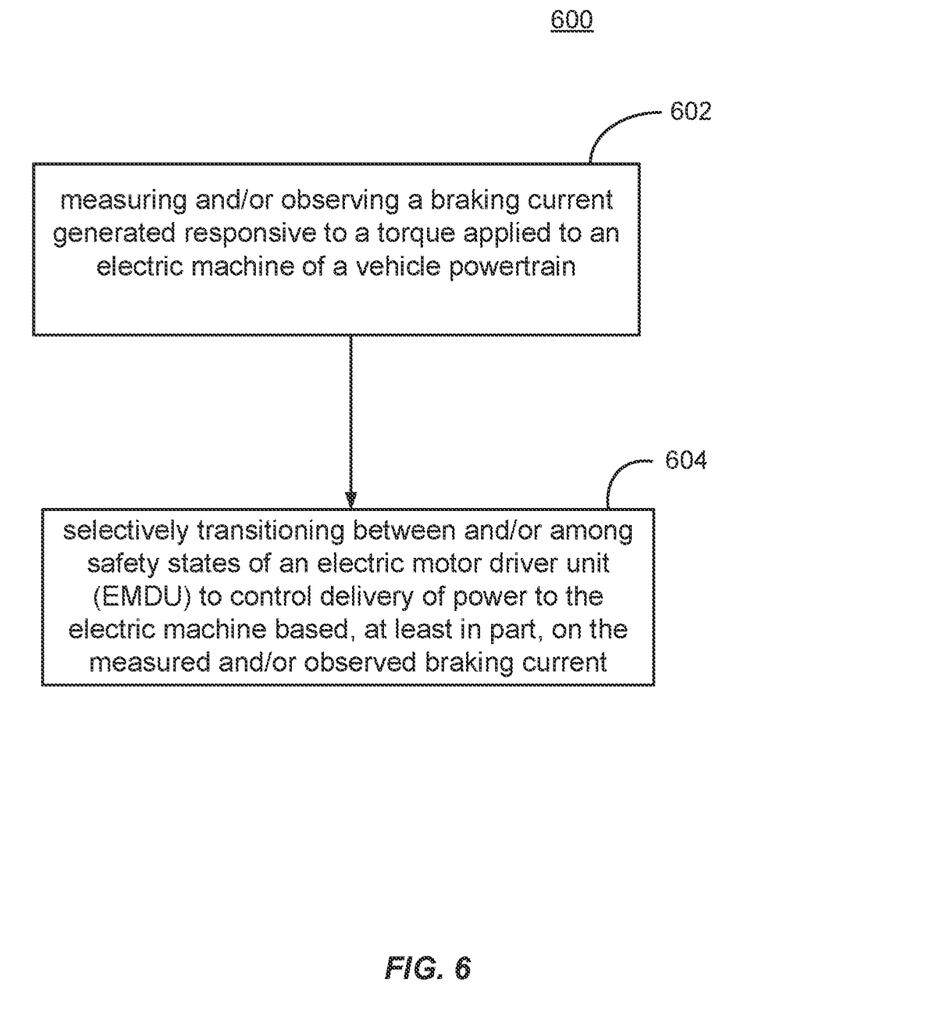
FIG. 6 is a flow diagram of a process according to an embodiment.

FIG. 6 is a flow diagram of a process 600 to implement transitioning of an EMDU between and/or among safety states such as in a hardware control mode (e.g., following detection of a critical fault at an MCU). Block 602 may comprise observing and/or measuring a braking current generated responsive to a torque applied to an electric machine of a vehicle powertrain. Such a braking current may be generated, for example, in a process of regenerative braking. Observations and/or measurements of a braking current may be obtained, for example, from one or more current sensors coupled to a power signal, such as current sensor 502 (FIG. 5).

Block 604 may comprise transition of an EMDU between and/or among safety states, such as safety states 6SO and 3PS based, at least in part, on an observation and/or measurement of a braking current obtained at block 602. For example, block 604 may execute and/or control transitions between and/or among safety states of an EMDU while an EMDU is in a hardware control state such as, for example, GDB HW control state 204, 304 or 404, for example. In a particular implementation, transitions at block 604 may be controlled and/or initiated by logic and/or circuitry of an inverter to deliver power between an electric machine and a battery, such as logic and/or circuitry of inverter 506 (FIG. 5). By controlling transitions between and/or among safety states based on an observed braking current, such logic and/or circuitry may better optimize such transitions in the absence of an observed battery voltage.

According to an embodiment, all or a portion of system 500 may be formed by and/or expressed, in whole or in part, in transistors and/or lower metal interconnects (not shown) in processes (e.g., front end-of-line and/or back-end-of-line processes) such as processes to form complementary metal oxide semiconductor (CMOS) circuitry, just as an example. It should be understood, however that this is merely an example of how circuitry may be formed in a device in a front end-of-line process, and claimed subject matter is not limited in this respect.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented to include, but not be limited to, formats supporting behavioral languages such as C, Verilog, and VHDL, formats supporting register level description languages like RTL, formats supporting geometry description languages such as GDSII, GDSIII, GDSIV, CIF, MEBES and any other suitable formats and languages. Storage media in which such formatted data and/or instructions may be embodied to include, but not be limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves may include, but not be limited to, transfers (uploads, downloads, e-mail, etc.) over the Internet and/or other computer networks via one or more electronic communication protocols (e.g., HTTP, FTP, SMTP, etc.).

If received within a computer system via one or more machine-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process (e.g., wafer fabrication process).

In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

For one or more embodiments, all or a portion of system 500 may be implemented in a device, such as a computing device and/or networking device, that may comprise, for example, any of a wide range of digital electronic devices, such computing devices embedded in a motor vehicle. In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Figure 7:
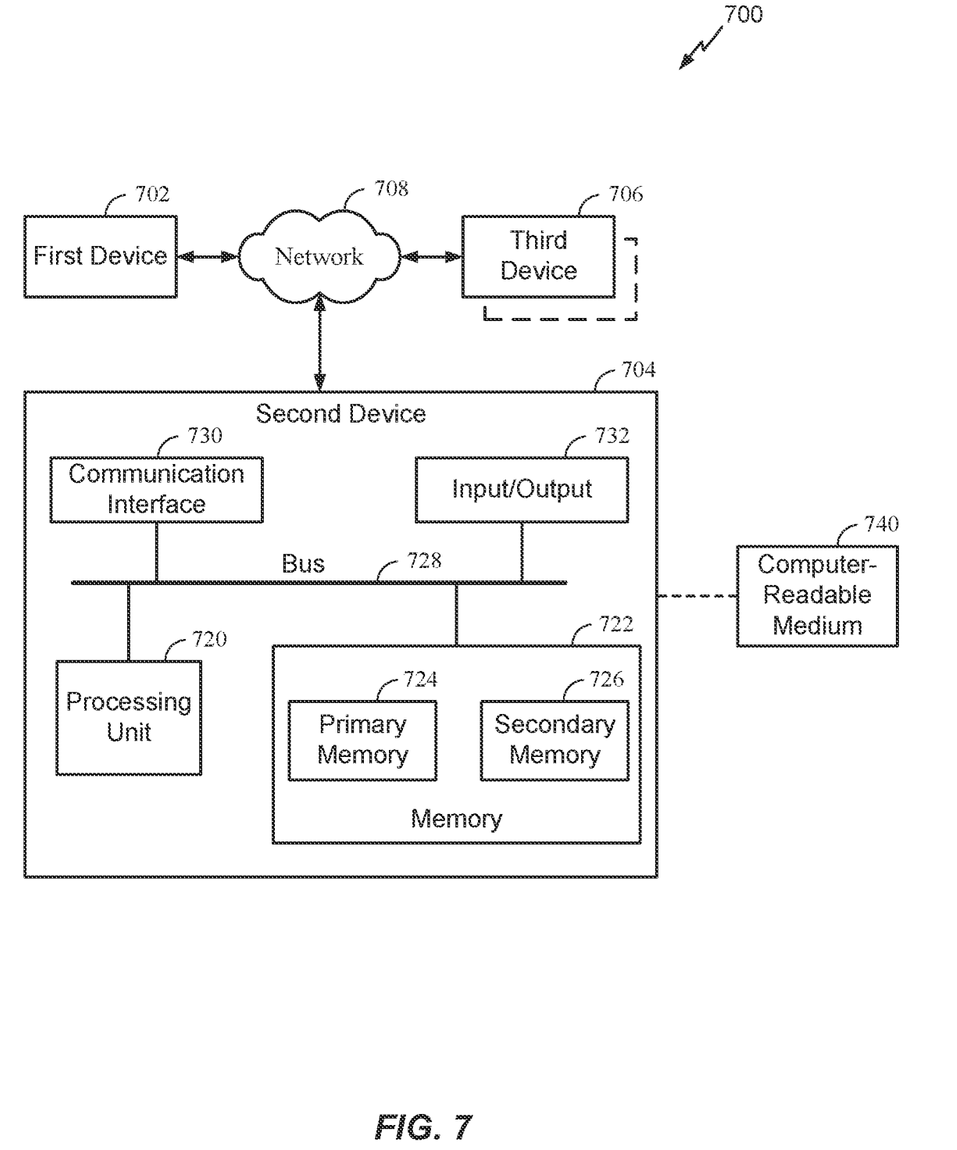
FIG. 7 is a schematic block diagram of an example computing system in accordance with an implementation.

FIG. 7 shows an embodiment 700 of a system that may be employed to implement either type or both types of networks. Network 708 may comprise one or more network connections, links, processes, services, applications, and/or resources to facilitate and/or support communications, such as an exchange of communication signals, for example, between a computing device, such as computing device 702, and another computing device, such as computing device 706, which may, for example, comprise one or more client computing devices and/or one or more computing devices embedded in a vehicle. By way of example, but not limitation computing devices 702, 704 and 704 may comprise an electronic control unit (ECU), motor control unit (MCU), hybrid control unit (HCU) or telematics control unit (TCU), just to provide a few examples. Additionally by way of example, but not limitation, network 708 may comprise wireless and/or wired communication links or signaling busses, or a combination thereof, to facilitate communication between and/or among embedded devices. Example devices in FIG. 7 may comprise features, for example, of a client computing device and/or embedded computing device, in an embodiment. It is further noted that the term computing device, in general, whether employed as a client and/or as embedded computing device, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), field programmable gate array (FPGA), control circuit, microcontroller, or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 through FIG. 4 and FIG. 6 in the text associated with the foregoing figure(s) of the present patent application.

Referring now to FIG. 7, computing device 702 ('first device' in figure) may interface with computing device 704 ('second device' in figure), which may, for example, also comprise features of a client computing device and/or embedded computing device, in an embodiment. Processor (e.g., processing device) 720 and memory 722, which may comprise primary memory 724 and secondary memory 726, may communicate by way of a communication bus 715, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 704, as depicted in FIG. 7, is merely one example, and claimed subject matter is not limited in scope to this particular example. FIG. 7 may further comprise a communication interface 730 which may comprise circuitry and/or devices to facilitate transmission of messages between second device 704 and first device 702 and/or third device 706 in a physical transmission medium over network 708 using one or more network communication techniques identified herein, for example. In a particular implementation, communication interface 730 may comprise a transmitter device including devices and/or circuitry to modulate a physical signal in physical transmission medium according to a particular communication format based, at least in part, on a message that is intended for receipt by one or more recipient devices. Similarly, communication interface 730 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, high-definition televisions, digital versatile disc (DVD) and/or other optical disc players and/or recorders, game consoles, satellite television receivers, Internet of Things (IoT) type devices, embedded computing devices such as computing device embedded in a motor vehicle and/or motor vehicle subsystem, or any combination of the foregoing. Further, unless specifically stated otherwise, a process as described, such as with reference to flow diagrams and/or otherwise, may also be executed and/or affected, in whole or in part, by a computing device. A device, such as a computing device, may vary in terms of capabilities and/or features. Claimed subject matter is intended to cover a wide range of potential variations.

In FIG. 7, computing device 702 may provide one or more sources of executable computer instructions in the form physical states and/or signals (e.g., stored in memory states), for example. Computing device 702 may communicate with computing device 704 by way of a network connection, such as via network 708, for example. As previously mentioned, a connection, while physical, may not necessarily be tangible. Although computing device 704 of FIG. 7 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 722 may comprise any non-transitory storage mechanism. Memory 722 may comprise, for example, primary memory 724 and secondary memory 726, additional memory circuits, mechanisms, or combinations thereof may be used. Memory 722 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 722 may be utilized to store a program of executable computer instructions. For example, processor 720 may fetch executable instructions from memory and proceed to execute the fetched instructions. Memory 722 may also comprise a memory controller for accessing device readable-medium 740 that may carry and/or make accessible digital content, which may include code, and/or instructions, for example, executable by processor 720 and/or some other device, such as a controller, as one example, capable of executing computer instructions, for example. Under direction of processor 720, a non-transitory memory, such as memory cells storing physical states (e.g., memory states), comprising, for example, a program of executable computer instructions, may be executed by processor 720 and able to generate signals to be communicated via a network, for example, as previously described. Generated signals may also be stored in memory, also previously suggested.

Memory 722 may store electronic files and/or electronic documents, and may also comprise a computer-readable medium that may carry and/or make accessible content, including code and/or instructions, for example, executable by processor 720, as one example, capable of executing computer instructions, for example. The term electronic file and/or the term electronic document should be understood to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 7, processor 720 may comprise one or more circuits, such as digital circuits, to perform at least a portion of a computing procedure and/or process. By way of example, but not limitation, processor 720 may comprise one or more processors, such as controllers, microprocessors, control circuits, field programmable gate arrays (FPGAs), microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 720 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 7 also illustrates computing device 704 as including a component 732 operable with input/output devices, for example, so that signals and/or states may be appropriately communicated between devices, such as computing device 704 and an input device and/or computing device 704 and an output device. A user may make use of an input device, such as a keyboard, motion sensor, touchscreen or microphone, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. An apparatus comprising:
   a vehicle powertrain comprising an electric machine; and
   an electric motor driver unit (EMDU) to control delivery of power to the electric machine, the EMDU to transition between and/or among safety states, wherein the transition between and/or among the safety states is based, at least in part, on a measured braking current which is generated responsive to a torque applied to the electric machine and is measured via a current sensor.

2. The apparatus of claim 1, wherein the safety states of the EMDU comprise at least a six open switch state and a three phase short state.

3. The apparatus of claim 1, wherein the EMDU is configured to transition between and/or among safety states based, at least in part, on a measurement of a voltage signal applied to one or more supply terminals.

4. The apparatus of claim 1, wherein the EMDU is configured to transition to a hardware control mode responsive to detection of a critical fault.

5. The apparatus of claim 1, wherein the current sensor is coupled to a DC voltage supply.

6. The apparatus of claim 1, wherein the EMDU is to transition between and/or among the safety states of the EMDU, wherein the transition between and/or among the safety states is responsive to the measured braking current exceeding a defined threshold current.

7. The apparatus of claim 1, wherein the EMDU is to transition between and/or among the safety states of the EMDU, wherein the transition between and/or among the safety states is responsive to a measured DC supply voltage exceeding a defined threshold voltage.

8. The apparatus of claim 1, wherein the EMDU is to transition between and/or among the safety states of the EMDU, wherein the transition between and/or among the safety states is responsive to either the measured braking current exceeding a defined threshold current for a set duration or a measured DC supply voltage exceeding a defined threshold voltage.

9. The apparatus of claim 1, wherein the EMDU is to transition between and/or among the safety states of the EMDU, wherein the transition between and/or among the safety states is responsive to the measured braking current being below a defined threshold current for a set duration.

10. The apparatus of claim 1, wherein the EMDU is to transition between and/or among the safety states of the EMDU, wherein the transition between and/or among the safety states is responsive to a measured DC supply voltage being below a defined threshold voltage.

11. A method comprising:
    measuring a braking current generated responsive to a torque applied to an electric machine of a vehicle powertrain; and
    selectively transitioning between and/or among safety states of an electric motor driver unit (EMDU) to control delivery of power to the electric machine based, at least in part, on the measured braking current.

12. The method of claim 11, wherein the safety states of the EMDU comprise at least a six open switch state and a three phase short state.

13. The method of claim 11, wherein selectively transitioning between and/or among safety states is further based, at least in part, on a measurement of a voltage signal applied to one or more supply terminals.

14. The method of claim 11, wherein the EMDU is transitioned to a hardware control mode responsive to detection of a critical fault.

15. The method of claim 11, wherein measuring the braking current comprises obtaining measurements from a current sensor coupled to a DC voltage supply.

16. An article comprising:
    a non-transitory storage medium comprising computer-readable instructions stored thereon which are executable by one or more processors of a computing device to:
    obtain measurements, via a current sensor, of a braking current generated responsive to a torque applied to an electric machine of a vehicle powertrain; and
    selectively transition an electric motor driver unit (EMDU) to control delivery of power to the electric machine between and/or among safety states based, at least in part, on the measurements of the braking current.

17. The article of claim 16, wherein the instructions are further executable by the one or more processors to selectively initiate transition between and/or among the safety states of the EMDU, wherein the transition between and/or among the safety states of the EMDU is initiated responsive to either the measurements of the braking current exceeding a defined threshold current or a measured DC supply voltage exceeding a defined threshold voltage.

18. The article of claim 16, wherein the instructions are further executable by the one or more processors to selectively initiate transition between and/or among the safety states of the EMDU, wherein the transition between and/or among the safety states of the EMDU is initiated responsive to either the measurements of the braking current exceeding a defined threshold current for a set duration or a measured DC supply voltage exceeding a defined threshold voltage.

19. The article of claim 16, wherein the instructions are further executable by the one or more processors to selectively initiate transition between and/or among the safety states of the EMDU, wherein the transition between and/or among the safety states of the EMDU is initiated responsive to the measurements of the braking current being below a defined threshold current for a set duration.

20. The article of claim 16, wherein the instructions are further executable by the one or more processors to selectively initiate transition between and/or among the safety states of the EMDU, wherein the transition between and/or among the safety states of the EMDU is initiated responsive to the measurements of a DC supply voltage being below a defined threshold voltage.

\* \* \* \* \*